Jan. 3, 1950   K. H. BROWNLEE   2,493,523
MACHINE FOR APPLYING TRANSFERS
Filed March 6, 1946   7 Sheets-Sheet 1
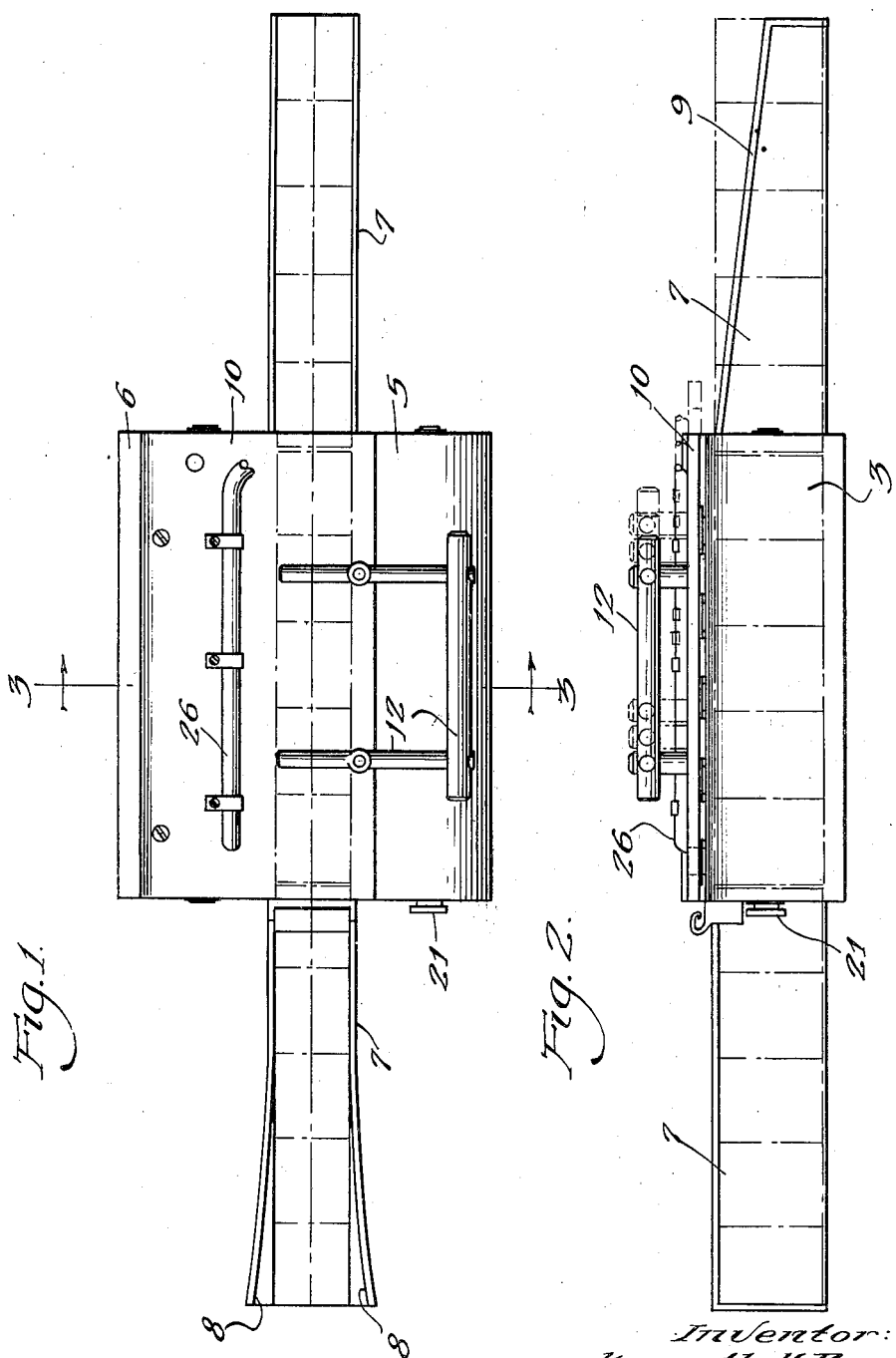
Inventor:
Kenneth H. Brownlee
By: Harold Olsen
Attorney Inventor:
Kenneth H. Brownlee
By: Harold Olsen
Attorney.

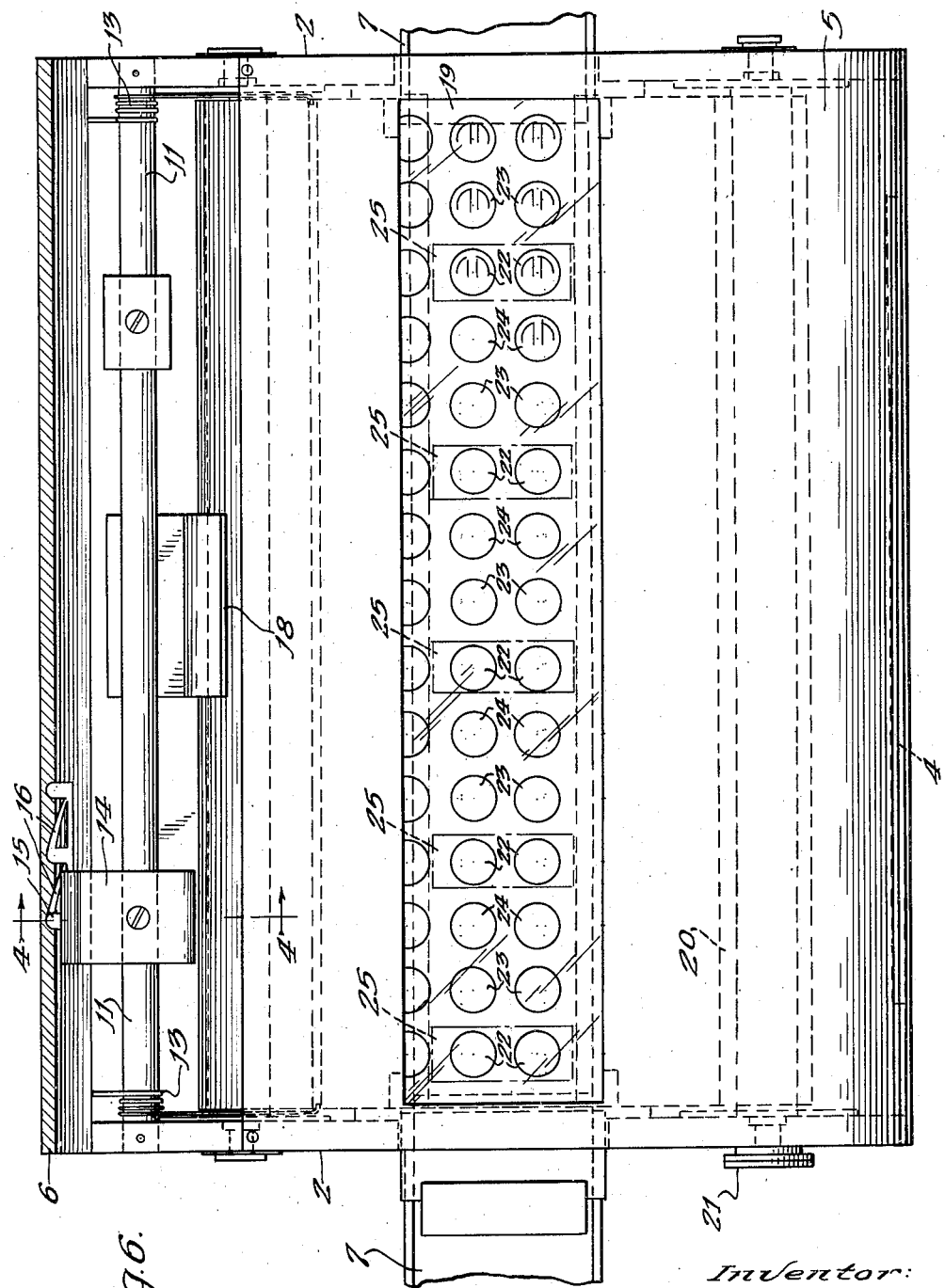

Jan. 3, 1950  K. H. BROWNLEE  2,493,523
MACHINE FOR APPLYING TRANSFERS
Filed March 6, 1946  7 Sheets-Sheet 4
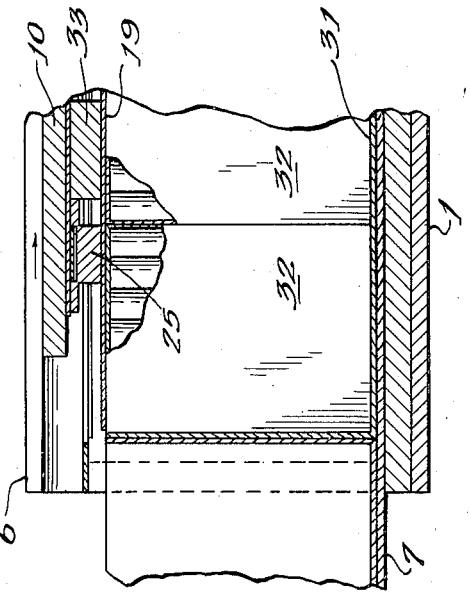
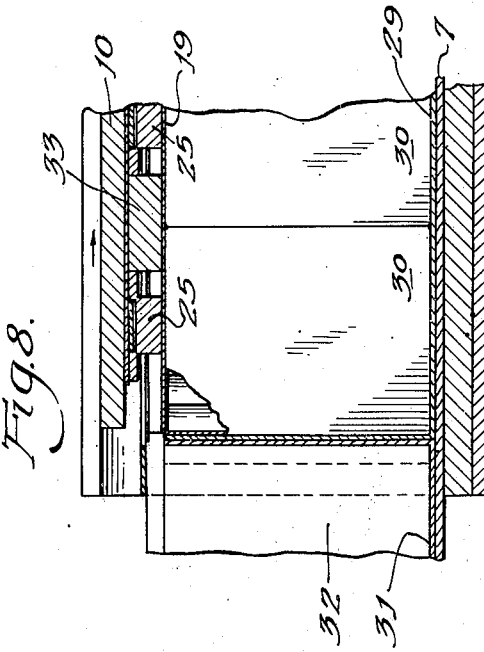
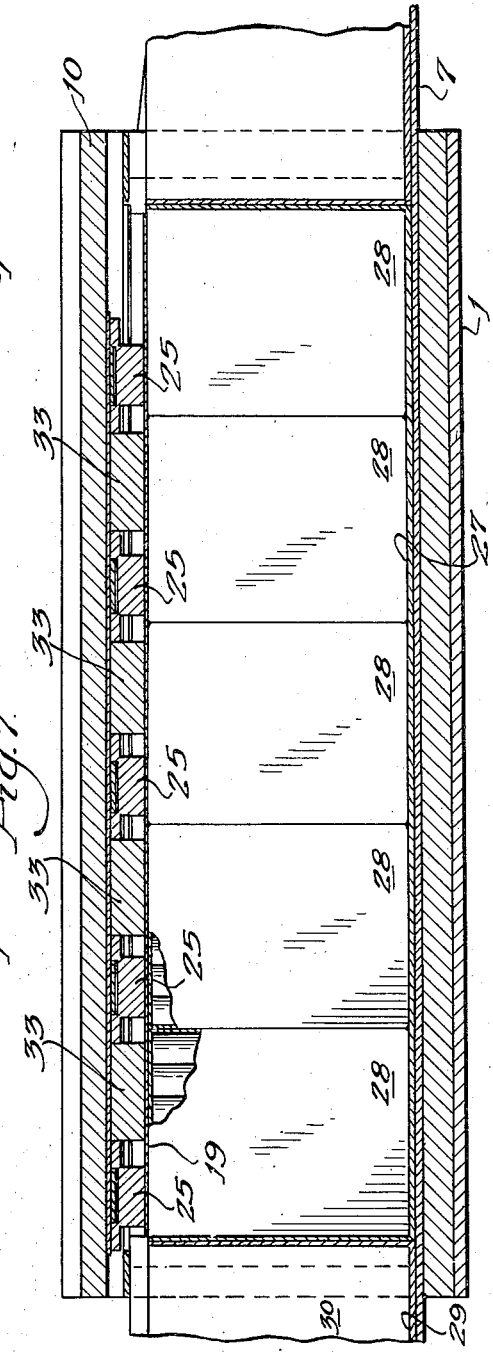
Inventor:
Kenneth H. Brownlee
By: Harold Olson
Attorney Jan. 3, 1950    K. H. BROWNLEE    2,493,523
MACHINE FOR APPLYING TRANSFERS
Filed March 6, 1946    7 Sheets-Sheet 5
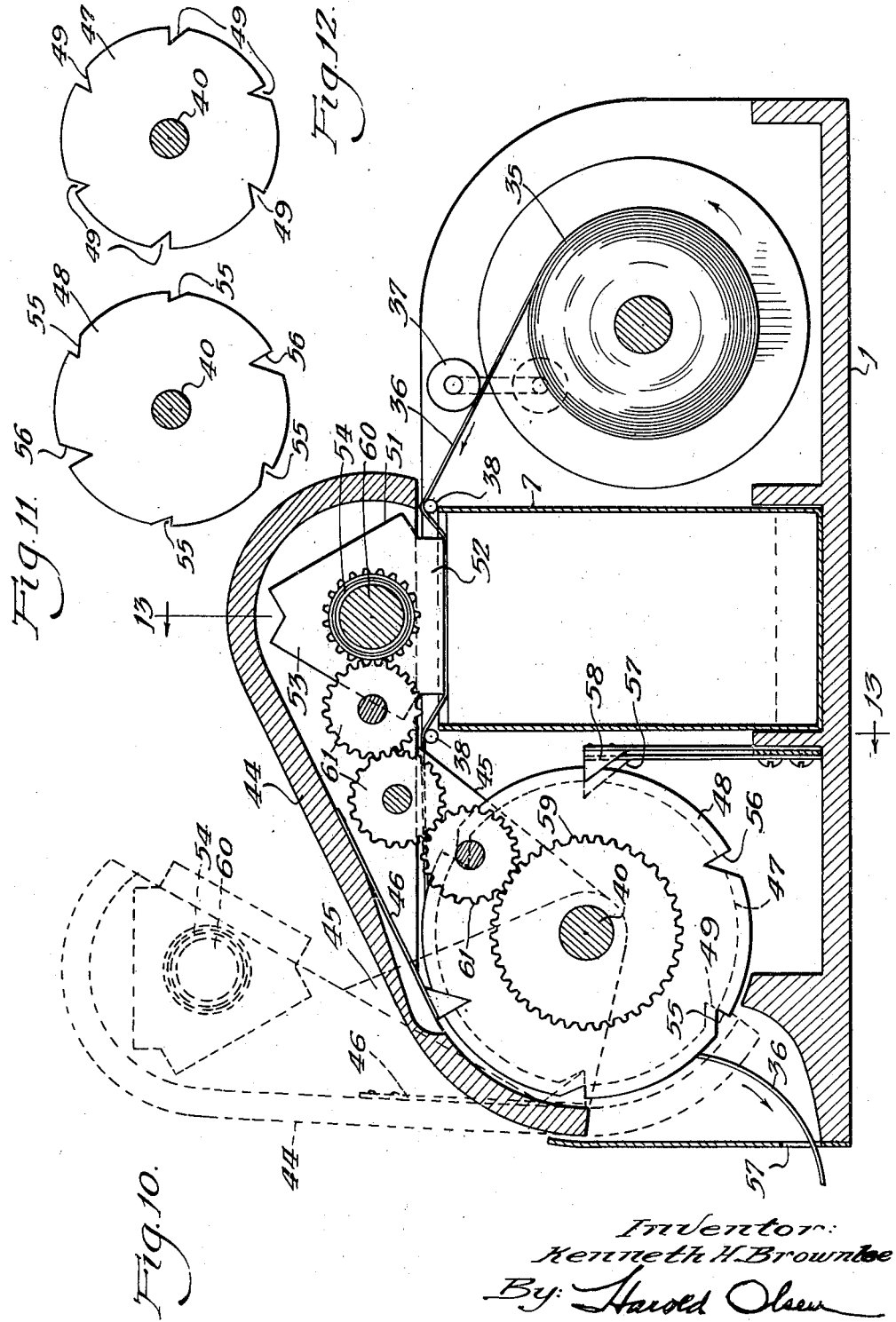
Inventor:
Kenneth H. Brownlee
By: Harold Olsen
Attorney.

Jan. 3, 1950   K. H. BROWNLEE   2,493,523
MACHINE FOR APPLYING TRANSFERS
Filed March 6, 1946   7 Sheets-Sheet 6
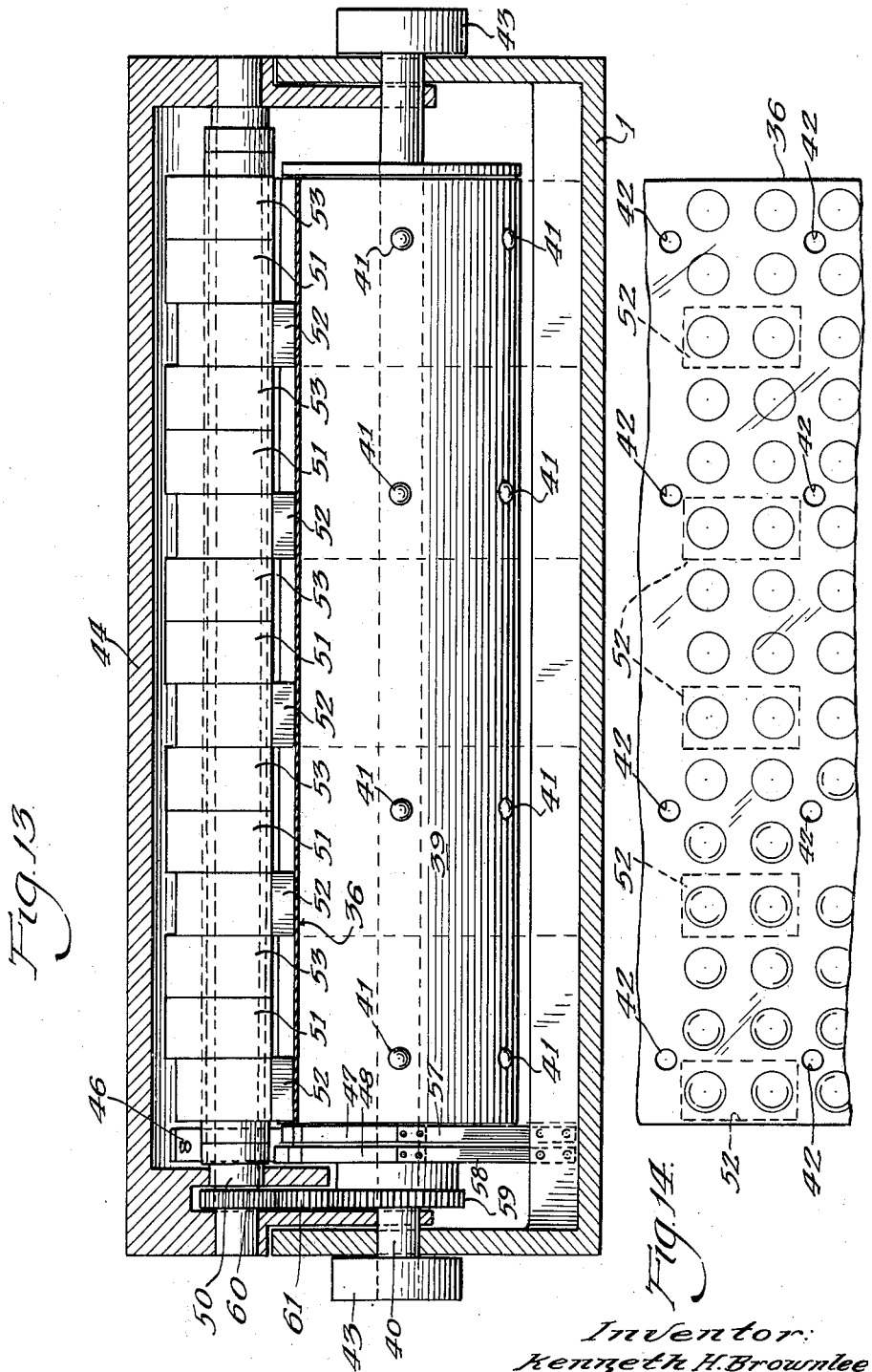
Inventor:
Kenneth H. Brownlee
By Harold Olsen
Attorney Jan. 3, 1950     K. H. BROWNLEE     2,493,523
MACHINE FOR APPLYING TRANSFERS
Filed March 6, 1946     7 Sheets-Sheet 7

Inventor:
Kenneth H. Brownlee
By: Harold Olsen
Attorney

Patented Jan. 3, 1950

2,493,523

UNITED STATES PATENT OFFICE 2,493,523

MACHINE FOR APPLYING TRANSFERS

Kenneth H. Brownlee, Skokie, Ill., assignor to The Meyercord Co., Chicago, Ill., a corporation of Illinois Application March 6, 1946, Serial No. 652,429

1 Claim. (Cl. 41—1)

This invention relates to a machine for applying transfers and, more particularly, to a machine adapted to apply a plurality of transfers simultaneously to a plurality of articles.

By the word "transfer," as used herein, I mean a transferable imprint, such as a decalcomania, or the like. I do not limit myself to any particular kind of imprint or decalcomania, it being sufficient for the purposes of my present invention that the transfer shall be removable from the usual backing or supporting sheet and affixed to the object upon which it is desired that the transfer shall appear.

It is quite common to supply revenue stamps, trade-mark stickers, identification labels, and the like, in the form of decalcomania which may be removed from a backing sheet by moistening or by the application of heat and applied to the objects singly. The labor cost of this procedure is often an item of considerable importance and it is desirable, therefore, to provide mechanism whereby the application may be made automatically and in large quantities simultaneously.

In my copending application, Serial Number 573,250, filed January 17, 1945, I have shown a machine for applying revenue stamps, in the form of decalcomania, to all the cigarette packages in a carton simultaneously. The invention of the present application is a machine of the same general character having many features of advantage over the form shown in said earlier application.

For purposes of illustration, I have again chosen to show my invention as embodied in a machine for applying revenue stamps to cigarette packages. To those skilled in the art, the application of my invention for other purposes will readily be apparent.

Because of simplicity of application, I have shown my machine as adapted for use with heat transferable decalcomania, but the invention is not limited thereto.

Broadly stated, my present invention has for its object to provide a machine for accurately and rapidly applying decalcomania to a plurality of articles simultaneously, the arrangement being such that the decalcomania may be selectively removed from a backing sheet having a plurality of groups of decalcomania arranged thereon in a manner to register with the articles to which they are to be affixed.

A further object is to provide a machine having applying means arranged to be shifted either manually or automatically so as to operate upon a selected group of decalcomania.

Another object is to provide a machine having means for feeding the decalcomania sheet either manually or automatically so as to position a plurality of groups of decalcomania for selective application to groups of articles.

Other objects of the invention and the many advantages thereof will become apparent as the description of the invention proceeds.

For illustrative purposes, I have shown in the accompanying drawings one embodiment of the invention in which the paper feed and shift of the applying means are accomplished manually and another form in which these operations are performed automatically. I do not limit myself to the particular details of construction shown in these drawings as modifications thereof will readily occur to those skilled in the art which may be advantageously employed without departing from the scope of my invention as set forth in the accompanying claims.

In the drawings:

Fig. 1 is a plan view of a machine embodying my invention;

Fig. 2 is a front elevation of the machine shown in Fig. 1;

Fig. 6 is a sectional view taken substantially on line 6—6 of Fig. 3;

Fig. 7 is a view, partly in section and partly in elevation, showing the relative position of the applying means and the packages when one group of transfers is being removed from the backing sheet and affixed to the packages;

Fig. 8 is a fragmentary view, similar to Fig. 7, showing the applying means shifted to position to apply a second group of transfers to a second group of packages;

Fig. 9 is a fragmentary view, similar to Fig. 8, showing the applying means shifted to apply a third group of transfers to a third group of packages;

Fig. 10 is a sectional view, similar to Fig. 3, but showing a modification of my invention, including automatic means for feeding the transfers and for shifting the applying means;

Fig. 11 is a view in elevation of the ratchet for controlling movement of the applying means;

Fig. 12 is a view in elevation of the ratchet for controlling movement of the paper feeding means;

Fig. 13 is a view in section taken substantially on line 13—13 of Fig. 10;

Fig. 14 is a fragmentary plan view of a transfer carrying sheet showing the arrangement of the transfers thereon;

Figure 3:
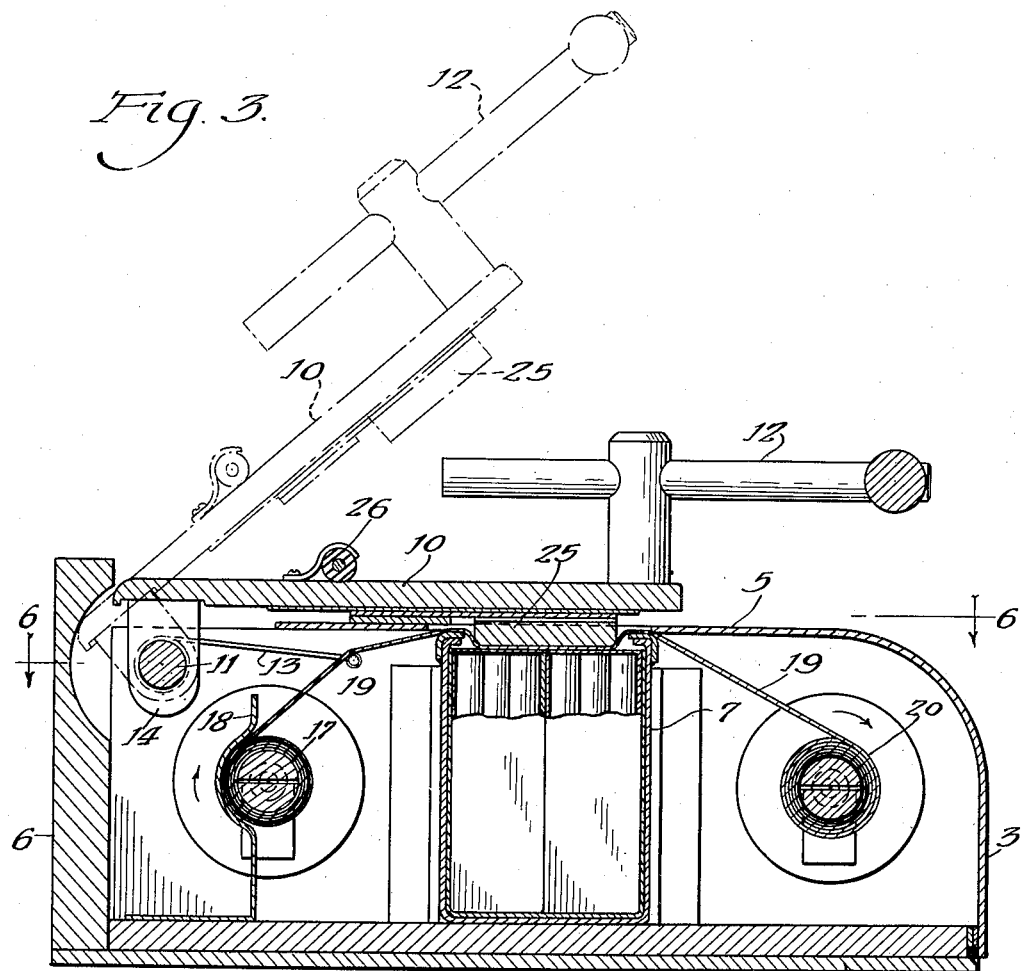
Fig. 3 is a sectional view taken substantially on line 3—3 of Fig. 1.

Referring now to the drawings, my machine comprises a box having a bottom 1, side walls 2, and a front wall 3, hinged to the bottom at 4. Said front wall 3 has a cover portion 5 overlying a part of the top of the box. The rear wall of the box is indicated by the reference numeral 6.

A guide chute 7 for the packages or articles to be marked extends through the box and beyond the side walls thereof. The entering end of said chute may be outwardly flared as at 8 to facilitate insertion of the packages or articles and the exit end may be tapered as at 9 to facilitate removal.

Because this illustrative embodiment of my invention is designed for the application of revenue stamps to the individual cigarette packages in a carton, the chute 7 is proportioned so as to accommodate that kind of container and the width of the box is substantially the length of an ordinary cigarette carton.

A cover plate 10 is pivotally and slidably mounted on a shaft or rod 11 extending between the side walls 2. The cover plate 10 is provided with a suitable handle 12 by which it may be raised or lowered. Springs 13 are arranged on the shaft 11 and bearing against the cover 10 so as to assist in raising said cover and maintain it in raised position.

A bearing block 14 is secured on the cover 10 and mounted on the shaft 11. Said bearing block has a guide pin 15 adapted to move in guide grooves 16 formed in the rear wall 6 of the box. (See Figs. 4 and 5.) These grooves are so arranged that the cover 10 may be shifted laterally (from left to right, as viewed in the drawings) and the extent of such lateral shifting is determined by the spacing of the revenue stamps, as will presently be described. It is sufficient now to point out that when the pin 15 is in the position shown in Fig. 5 the cover may be shifted to the right and the said pin 15 will move downwardly in the first of the inclined guide grooves 16. When the cover is raised again, said pin 15 may be moved in the second of the inclined grooves 16 and thus the cover shifted to a third position.

Figure 4:
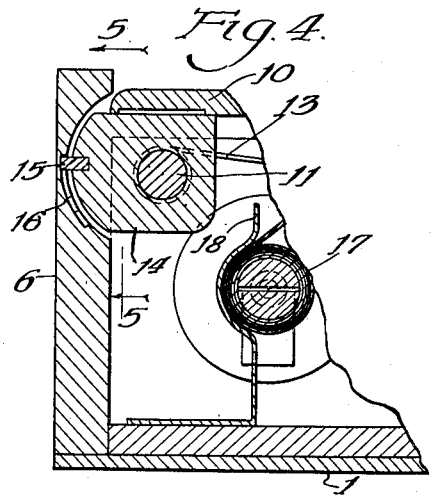
Fig. 4 is a fragmentary sectional view taken substantially on line 4—4 of Fig. 6.
Figure 5:
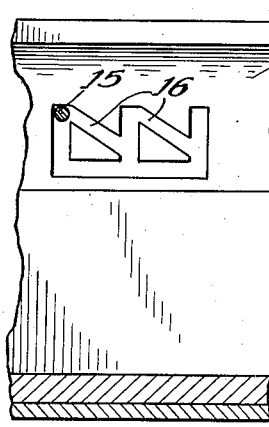
Fig. 5 is a fragmentary sectional view taken substantially on line 5—5 of Fig. 4.
Figure 17:
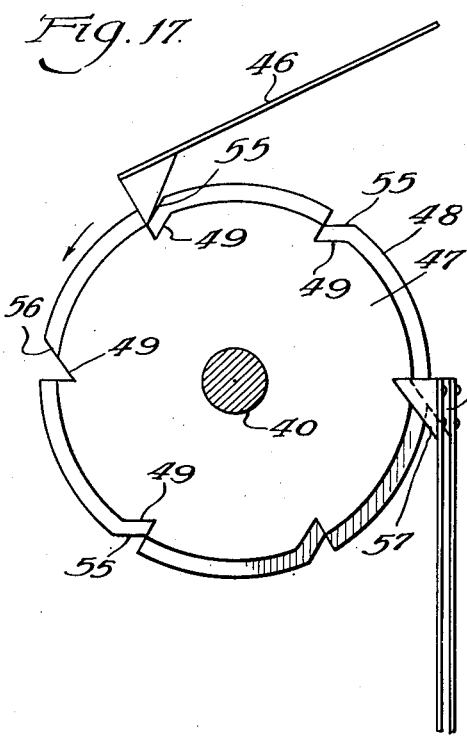
Fig. 17 is a view similar to Fig. 16, but showing the position of the ratchets and pawls when only the applying means is being shifted.
Figure 16:
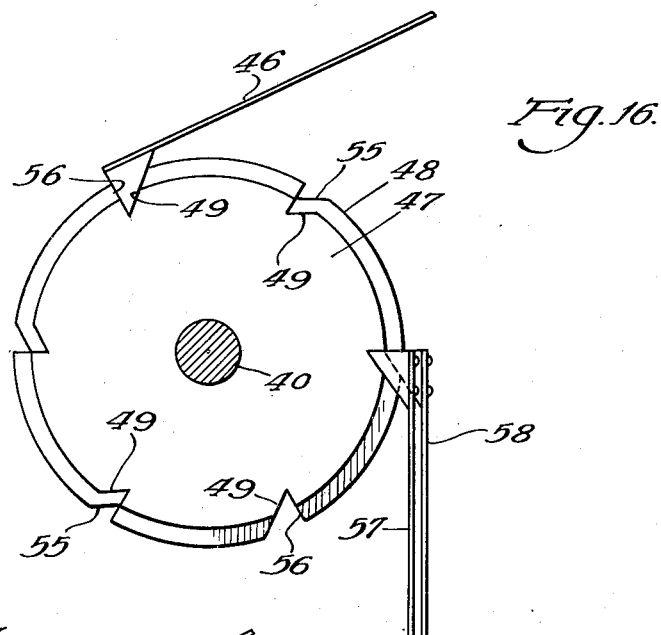
Fig. 16 is a view in elevation of the ratchets and pawls, as seen on line 16—16 of Fig. 15.
Figure 15:
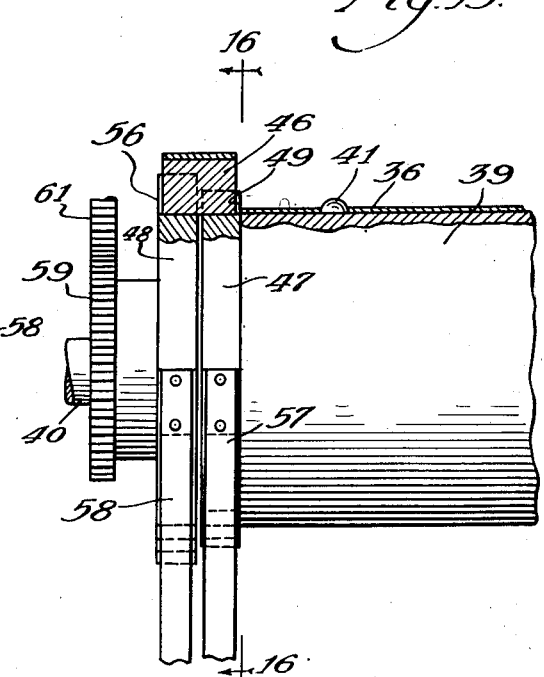
Fig. 15 is a fragmentary view, partly in elevation and partly in section, showing the paper feed roll and the controlling ratchets and pawls.

Within the side walls 2 and at the rear of the box, I provide bearings for a spool or roller 17 containing a roll of revenue stamps. To keep the spool from over-riding and to assure smooth and uniform feed of the stamps, I may provide suitable spring brakes 18 bearing against the spool, as shown in Figs. 3 and 4.

The stamp sheet used with my present machine is preferably of the kind disclosed in my copending application, Serial Number 590,450, filed April 26, 1945. That is to say, a backing sheet of paper is impregnated or coated with a suitable wax or the like having a relatively low melting point. The transfers or stamps are printed on the wax coated surface of the backing sheet and are removed therefrom by the application of heat sufficient to melt the wax and release the transfers which will then adhere to any surface to which they are applied.

In the drawings, the backing sheet 19 is shown as extending from the supply roll 17 forwardly over the open top of the guide chute 7 to a take-up spool or roller 20 journaled in the side walls 2 at the front of the box. The roller 20 has a suitable manually operable knob 21 extending beyond one of the side walls 2, by the operation of which the web of backing sheet may be drawn from the supply roll to present the sets of transfers or stamps in applying position over the open end of the chute 7. After all the transfers or stamps in applying position have been removed, the knob 21 is turned to draw the following sets of transfers into position, while the portion of the backing sheet which has been cleared is wound up on the take-up roll or spool 20.

The arrangement of the transfers or stamps on the backing sheet is shown in Fig. 6, and is the same as that shown in my aforementioned copending application, Serial Number 590,450. It is understood that the cigarette packages to which the stamps are to be applied are arranged in a carton in two rows of five packages each. This is the usual arrangement and it is with that in mind that the stamps or transfers are placed on the backing sheet 19.

In Fig. 6 I have illustrated the stamp sheet in position over the open top of the chute 7 and a carton of cigarette packages is shown in dotted lines below the sheet. The stamps are arranged in pairs, 22, 23 and 24, and there are five pairs of each number, thus providing sufficient stamps for three cartons. In this figure, the heating elements 25 are shown as overlying the pairs of stamps 22 so that in the operation presently to be described stamps will be transferred to each of the ten packages in a carton simultaneously. Thereafter, the heating elements may be moved to register with the pairs of stamps 23 so as to apply them to the packages in a second carton; and finally, the heating elements are shifted over to register with the pairs of stamps 24 which are to be affixed to the packages in a third carton. After these three operations, all the stamps overlying the top of the chute 7 have been removed and the operator turns the knob 21 to draw the next succeeding sets of stamps into position for application.

The heating elements 25 are secured to the under side of the cover plate 10 and are preferably heated by electricity supplied from any convenient source through a suitable conductor 26. There are five such heating elements and by reason of the laterally shifting movement of the cover plate 10 they may be brought into registry with any of the pairs of stamps 22, 23 or 24 according to the choice of the operator.

The operation of the foregoing described machine is as follows:

The cover plate 10 normally is held in the open position shown in dotted lines in Fig. 3 by the springs 13, thus permitting access to the interior of the box. A roll of transfers or stamps 17 is inserted in bearings provided therefor and the end of the web 19 is drawn across the open top of the chute 7. The cover portion 5 of the front wall is raised by swinging about the hinge 4, thus exposing the interior of the front of the box. The end of the web 19 is wound up on the take-up spool or roller 20 which is given a few turns by operation of the knob 21 until the first sets of stamps on the backing sheet are in proper position above the chute 7. The front cover plate is then closed by moving it into the position shown in Fig. 3. The machine is now ready for operation and the conductor 26 is connected to a convenient source of electric current.

A carton of cigarette packages is now opened so as to expose either the tops or bottoms of the packages and the carton is placed in the chute 7 and pushed along until the exposed packages come directly under the stamp sheet 19. It is understood, of course, that the stamps are on the under surface of the sheet 19 so that they may be brought into direct contact with the exposed ends of the packages to which they are to be applied.

From here on, the explanation of the operation will best be understood by reference to Figs. 7, 8 and 9. In Fig. 7, a carton 27 containing packages 28 is shown in position and the cover plate 10 has been brought down so as to press the heating elements 25 against the top of the sheet 19 and in registry with the pairs of stamps 22, shown in Fig. 6. The heat of the heating elements melts the wax coat on the sheet 19, thus releasing the stamps 22 which thereupon adhere to the ends of the packages 28. As will be understood, the stamps may be coated with a suitable heat responsive adhesive, as described in my said application, Serial Number 590,450.

A second opened carton 29 is now entered in the chute 7 and pushed along into stamp-applying position. In so doing, the carton 29 pushes the previous carton 27 out of the machine. In Fig. 8, I have shown one end of the machine with the carton 29 and its packages 30 in position to have stamps applied thereto. The cover plate 10 has been raised and shifted laterally, as heretofore explained, so as to bring the heating elements 25 into registry with the pairs of stamps 23. (See Fig. 6.) The heating elements 25 are now pressed against the top of the sheet 19 and said pairs of stamps 23 will leave the backing sheet and adhere to the packages 30.

A third opened carton 31 is now entered into the chute 7 and pushed along until the exposed ends of its packages 32 are in position to have stamps applied thereto. In so doing, the carton 31 pushes the carton 29 out of the machine. The said carton 31 is shown in position in Fig. 9. The cover plate 10 is again shifted laterally so that the heating elements 25 are brought into registry with the pairs of stamps 24. (See Fig. 6.) The heating elements are now pressed against the top of the stamp sheet 19 whereupon the stamps 24 are released from the backing sheet and affixed to the packages 32. At the end of this operation, all of the groups of stamps 22, 23 and 24 have been removed from the backing sheet 19 and new sets of stamps will be brought into applying position by turning the knob 21.

It will be understood, of course, that the sets of stamps need not be applied in the order described. The position of the stamps and the applying means are readily observed by the operator who can select at will the sets of stamps for removal.

It may be desirable to provide the under side of the cover plate 10 with presser elements 33 located between the heating elements 25 as shown in Figs. 7, 8 and 9. These elements 33 will protect the sets of stamps that are awaiting application from the heat of the elements 25 and they also tend to assure an even contact with the stamp sheet and the exposed ends of the packages.

The machine thus far described is constructed for manual shifting of the heating elements and manual feeding of the stamp sheet. These functions may be performed automatically and to that end I have shown a modification of my invention in Figs. 10 to 17, inclusive.

Fig. 10 is a view in section of the modified form, generally similar to the sectional view Fig. 3 of the machine heretofore described. In said Fig. 10, the bottom of the box is again indicated by the reference numeral 1 and the feed and guide chute by the numeral 7.

In this case, a supply roll 35 of stamps is supported in the box in front of the guide chute 7. The web of backing sheet 36 passes upwardly under a pressure roller 37 and across the open top of the chute 7. Suitable guide and tension rods or rollers 38 may be located at each side of the chute 7 and near the top thereof.

The web 36 passes rearwardly to a feed drum 39 mounted on the shaft 40. The drum 39 is provided with pins or projections 41 (see Fig. 13) which are arranged to enter holes 42 in the backing sheet 36 (see Fig. 14). The shaft 40 is provided with a knob, or knobs, 43 extending beyond the side walls of the box and by turning these knobs, the feed roll 39 may be manually rotated so as accurately to position the stamps when operation is initiated. They also permit manual operation at any time should the automatic means fail properly to position the stamps.

In this form of the invention, the cover plate 44 is pivotally mounted on the shaft 40 by lugs or side plates 45. The cover plate 44 carries on its under side a pawl 46 arranged to actuate two ratchets 47 and 48 which are mounted on the shaft 40.

The ratchet 47 (see Fig. 12) is the paper feeding ratchet for operating the feed drum 39. This ratchet is provided with six notches 49, all of the same depth. The arrangement is such that whenever the pawl 46 enters one of said notches the ratchet 47 will be rotated counter-clockwise (see Figs. 16 and 17) one-sixth revolution. By this means the feed roll is rotated counter-clockwise to draw the web 36 from the supply roll 35 and thus present new sets of stamps in applying position above the open top of the chute 7. But since there are three sets of stamps for removal while the sheet remains stationary, it is required that the pawl 46 shall actuate the ratchet 47 only every third time the cover plate 44 is raised. This is accomplished by an arrangement presently to be described.

Journaled in the front end of the cover plate 44 is a roller 50 which is provided with three sets of heating elements 51, 52 and 53. All of these heating elements are heated electrically by a suitable electric resistance heating coil 54 located within the roller.

As will be seen by reference to Fig. 13, there are five such heating elements on each face of the roller and they are so spaced as to register with the stamps shown in Fig. 14. This arrangement is such that, when the roller 50 is rotated, a selected set of heating elements, 51, 52 or 53, may be brought into registry with the corresponding stamps on the stamp sheet 36.

The said roller 50 is rotated automatically in order to present the selected set of heating elements in applying position. The automatic mechanism comprises the ratchet 48, heretofore described, which is mounted on the shaft 40 and is actuated by the pawl 46 carried by the cover plate 44. As will be seen in Fig. 11, the ratchet 48 is also provided with six notches. Four of these notches, designated 55, are relatively shallow and two notches 56 are relatively deep. It is also noted that the ratchet 48 is of slightly greater diameter than the ratchet 47. It follows from this construction that the operating pawl 46 will actuate the ratchet 48 each time the cover plate 44 is raised, whether the pawl engages one of the shallow notches 55 or one of the deeper notches 56. However, when the pawl 46 engages one of the deeper notches 56, it will also enter into one of the notches 49 on the ratchet 47. (See Fig. 16.) Therefore, the paper feed ratchet 47 will be actuated only when the pawl 46 enters the deep notches 56 in the ratchet 48. The result is that the paper feed ratchet 47 is actuated only every third time that the cover plate is raised. This is so that all three sets of heating elements may be used, each for removing one of the sets of stamps, and when all three sets of the stamps have been removed, thus leaving the backing sheet clear, the feed mechanism just above described will come into play to draw an additional length of the web 36 from the supply roll 35 and thus position three new sets of stamps for application. The end of the web 36 which has been cleared of stamps leaves the box through an opening 56 at the back thereof.

It will be observed also that, when the pawl 46 is riding on the surface of the ratchet 48, it will not contact the ratchet 47 which is of smaller diameter. (See Fig. 17.) Also, when the pawl 46 enters one of the shallow notches 55 of the ratchet 48, the pawl will still not engage any of the notches in the ratchet 47. The engagement of the pawl in notches in both ratchets occurs only when the said pawl enters the deep notches 56 in the ratchet 48.

The ratchet 47 has a retaining pawl 57 and the ratchet 48, a retaining pawl 58, both for the purpose of preventing reverse rotation of said ratchets.

Continuing now with the description of the rotating mechanism for the heating elements, and by reference to Figs. 10 and 13, it will be observed that a gear 59 is mounted on the shaft 40 and connected to the ratchet 48, which gear transmits motion to a gear 60 on the heating element roller 50 through suitable intervening gears 61. When the gear 59 is rotated by movement of the ratchet 48 through the pawl 46, the intervening gears 61 cause a corresponding rotation of the gear 60 so that the heating element roller 50 is turned sufficiently to present a set of heating elements in position to transfer the stamps.

By three operations of the cover plate 44, three sets of stamps on the backing sheet 36 will be removed therefrom through the application of heat, each set being acted upon by a different one of the sets of heating elements. The web 36 is then drawn through the machine by the feed drum 39 a sufficient distance to place the succeeding sets of stamps in applying position.

As in the description of the operation of the first embodiment, the operator will manually insert the cartons into the chute 7, and each succeeding carton will push the marked carton out of the machine. The machine of this modified form differs from the first described embodiment in that I have provided automatic means for advancing the stamp sheet through the machine and automatic means for placing a selected group of heating elements in stamp applying position. These two automatic means are so related that the sequence of operations is automatically performed; that is to say, for each stamp transfer, a different set of heating elements is used and after three such operations, the stamp sheet is advanced, and the cycle is repeated.

Each form of my invention presents a marked improvement over present practices and will result in great economy where large quantities of articles are to have revenue stamps or trade-mark labels affixed. My machines are simple in construction and operation and require but little skill on the part of the operator.

I claim as my invention:

In a machine for applying transfers to groups of articles simultaneously, means for moving groups of transfers into applying position, a movable cover carrying a plurality of applying means, means operated by movement of said cover for moving said applying means into applying position, and means operable by movement of said cover after each of said applying means has performed an applying operation for moving additional groups of transfers into applying position.

KENNETH H. BROWNLEE.

REFERENCES CITED

The following references are of record in the file of this patent:

UNITED STATES PATENTS

| Number | Name | Date |
|---|---|---|
| 589,087 | Ingle | Aug. 31, 1897 |
| 1,145,794 | Prinfold | July 6, 1918 |
| 1,596,257 | Tamberlin | Aug. 17, 1926 |
| 1,858,389 | Brown | May 17, 1932 |
| 1,922,852 | Humphrey | Aug. 15, 1933 |
| 1,973,101 | Ready | Sept. 11, 1934 |
| 2,324,411 | Miller | July 13, 1943 |